April 4, 1961  H. A. EHRENFREUND  2,978,136
LAMINATED PANEL CABINET STRUCTURE
Filed June 10, 1958
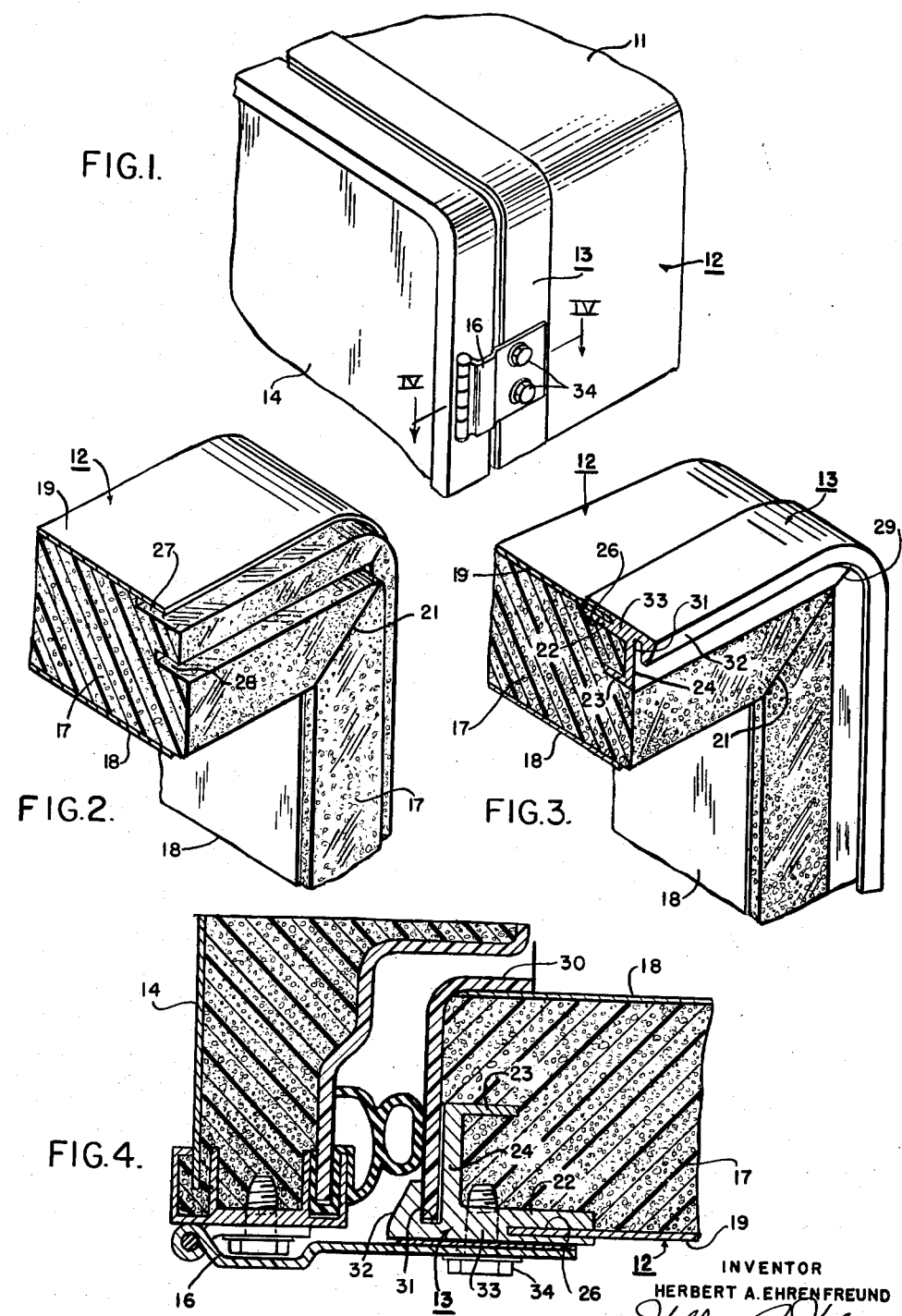
INVENTOR
HERBERT A. EHRENFREUND
BY *William J. Foley*
ATTORNEY United States Patent Office 2,978,136
Patented Apr. 4, 1961

2,978,136

LAMINATED PANEL CABINET STRUCTURE

Herbert A. Ehrenfreund, Longmeadow, Mass., assignor to Westinghouse Electric Corporation, East Pittsburgh, Pa., a corporation of Pennsylvania Filed June 10, 1958, Ser. No. 741,153

8 Claims. (Cl. 220—9)

This invention relates to laminated panel structures and to cabinets formed from laminated panels. More particularly, the invention concerns an improved structural arrangement for laminated panels of the type having a low density, low strength core, and one or more thin facing sheets bonded to the faces of the core. The panel structures embraced by this invention are particularly well suited for the construction of refrigerator cabinets, although there are numerous other applications therefor in cabinet structures generally and in other construction fields.

Laminated sandwich panels having low density cores made from, for example, foamed material such as foamed polystyrene or foamed polyurethene, and having facing sheets of dense but thin material, such as, for example, metal or polyester resin sheeting, are generally sufficiently rigid to permit a self-supporting cabinet to be formed therefrom. Such panels are, however, characteristically lacking in the ability to resist sharp blows, particularly along their edges, where the edges of the core and facing sheets are exposed. Both the core material and the thin facing sheets are relatively weak in shear and tension, and the panels are, therefore, subject to delamination when forces are applied to the panel which tend to peel the facing sheets from the core. Moreover, neither the core material nor the facing sheets possess sufficient strength to readily retain load bearing screw fasteners or the like normally employed for mounting closure members and accessories on the cabinets.

This invention contemplates the use of a reinforcing member, preferably made of metal or other relatively rigid material, at the edge of a panel which is susceptible of being damaged or which is required to provide structural support for other elements through members that are fastened into the panel. This reinforcing member extends along the edge of the panel and has a generally U-shaped cross-section, so as to provide two parallel flanges or flange portions which are imbedded in and adhesively secured to the low density core. The flange portions of the reinforcing member provide extended contact and attachment areas between the member and the core so that forces or blows applied to the member are dissipated over large areas of the core and the likelihood of the edge of the core being torn, penetrated or crushed by such blows is reduced.

Further in accordance with this invention, one of the flanges of the channel-shaped reinforcing member is thicker in cross-section than the other flange and has a longitudinally extending groove provided in one edge thereof for the purpose of receiving an edge of a facing sheet of the panel. This arrangement protects the edge of the facing sheet from deforming blows; prevents objects from becoming hooked under the edge of the sheet and causing delamination of the panel; and, of course, stiffens the edge of the facing sheet to increase the strength of the panel. The thicker flange of the reinforcing channel is adapted to receive screw fasteners and the like for the purpose of mounting cabinet components on the edge of the panel. Unlike the thin facing sheets of the panel itself, this thickened flange of the reinforcing channel can be bored and tapped so as to receive screws or bolts, and no additional cleats or back-up strips are required to reinforce the panel members.

It is contemplated that, in those cabinet structures wherein a laminated panel is folded to form two or more walls of the cabinet, and wherein the facing sheet of the panel extends over the outer surface of all of these walls, the reinforcing member will likewise be bent to conform to the configuration of the edge of the panel, with the flange portion thereof that receives the edge of the facing sheet extending continuously along the walls and around the junctions between the walls. The reinforcing member, then, "frames" the cabinet and adds structural rigidity to the overall cabinet structure.

While functioning primarily as a structural element, the reinforcing member can be provided with any desired surface configuration or treatment so as to perform a decorative or styling function for the cabinet structure. Also, since it is desirable to completely cover the exposed edges of the laminated panel, the reinforcing member is, in accordance with this invention, equipped with a cover strip retaining groove, or otherwise shaped to receive and assist in the retention of such cover strips.

The several objects, features and advantages of the invention will be made further apparent by the following detailed description of a preferred embodiment of the invention wherein reference is made to the accompanying drawing in which:

Fig. 1 is a fragmentary three-quarter perspective view of a portion of a refrigerator cabinet constructed in accordance with this invention;

Fig. 2 is a fragmentary perspective view of a cabinet corner formed from a laminated panel;

Fig. 3 is a another view of this same corner with a reinforcing member applied to the panel in accordance with the teachings of this invention; and Fig. 4 is a horizontal sectional view through the hinge structure of the cabinet illustrated in Fig. 1. This view is taken generally as indicated by the line IV—IV in Fig. 1.

Fig. 1 illustrates a front corner portion of a domestic refrigerator cabinet 11 embodying the features of this invention. The walls of the refrigerator are formed of a laminated sandwich panel 12 which is reinforced at its front edge by an elongated reinforcing member 13. The cabinet has a door 14 which functions as a closure member for an access opening at the front of the cabinet. In accordance with this invention, the door 14 is supported by a hinge 16 which is attached to the reinforcing member 13.

The laminated sandwich panel 12 which forms the walls of the refrigerator cabinet is illustrated in section in Fig. 2 and is of conventional construction. The panel must have heat insulating characteristics and its principal bulk, therefore, comprises a low density core 17 preferably made of a lightweight cellular material. Foamed plastic materials, such as expanded polystyrene and foamed polyurethene are commonly used as core materials and have a density of from one-half to ten pounds per cubic foot. The core 17 has facing sheets 18 and 19 adhesively secured to the broad faces thereof to complete the sandwich panel. These facing sheets are quite thin and are formed of dense material, such as sheet metal or resinous plastic sheet. Aluminum, for example, is particularly well suited for use as both facing sheets 18 and 19. While the thickness of the facing sheets will vary for different applications, .020 inch aluminum sheeting is suitable for the inner facing sheet 18 for refrigerator cabinet applications, and .035 inch aluminum sheeting is appropriate for the outer facing sheet 19 in that application. The outer sheet is preferably somewhat thicker because the outer surface of the refrigerator cabinet is more likely to be subjected to blows or indenting forces during use or transportation of the cabinet. Both sheets, however, are so thin as to be easily bent, particularly at their edges, and do not have sufficient body to permanently hold screw fasteners or the like. Another example of a material suitable for the inner facing sheet 18 is polystyrene sheet; this material having a relatively hard, easily cleaned surface. Glass reinforced polyester resin sheet material can also be used for the outer facing sheet 19.

It is conventional practice to form corner structures from the above described panels 12 by notching or grooving a flat panel through the inner facing sheet 18 and through a part of the core 17 as indicated at 21, and then bending or folding the panel. This fabrication technique results in a smooth unbroken exterior surface for the cabinet, since the outer facing sheet 19 of the panel extends around the corners and across adjoining wall surfaces. A suitable adhesive, such as polyurethane plastic, is generally applied to the groove 21 prior to folding, so that the continuity of the core 17 is restored and the corners of the cabinet strengthened.

A self-supporting cabinet structure having good heat insulating qualities and generally fair strength can be constructed by folding a panel 12 in the above described manner. It will be noted, however, that the edges of the core 17, as well as the edges of the facing sheets 18 and 19, are exposed. The low density materials from which the core 17 is made have very poor strength in tension and are also comparatively weak both in shear and compression. The core 17, therefore, is easily damaged. The thin facing sheets 18 and 19 also are easily damaged at their exposed edges and can be peeled from the core 17 if an object is hooked under the edge of one of the sheets. To strengthen the edge of the panel 12, and consequently the front edge of the cabinet 11, and to prevent damage to the edge of the panel core 17 and the outer facing sheet 19, this front edge of the cabinet 11 is equipped with the above-mentioned, elongated reinforcing member 13 which is partially imbedded in the edge of the panel 12. The reinforcing member is preferably formed of a relatively rigid but bendable material, such as metal. Aluminum, for example, is suitable for this member because it is readily formed to complex shapes, as by extruding or rolling.

The preferred configuration of the reinforcing member 13 is shown in Fig. 3, and the manner in which the panel 12 is prepared to receive the member 13 is illustrated in Fig. 2. Referring particularly to Fig. 3, the reinforcing member 13 has a generally U-shaped cross-section which provides two flanges or flange portions 22 and 23 that are connected by a web or connecting portion 24. The outer flange 22 of member 13 is preferably both wider and thicker than the inner flange 23 and has a longitudinal groove 26 extending part way in from the edge thereof for receiving the edge of the panel facing sheet 19.

The edge of the panel 12 is preferably recessed to receive the reinforcing member 13 prior to folding, that is, while the panel 12 is still in flat, slab-like condition. As can be seen from Fig. 2, two recesses, identified by the numerals 27 and 28, are provided which extend transversely inwardly of the core 17 from the exposed edge of the core. The outermost recess 27, which receives the outer flange 22 of the reinforcing member 13, extends for a distance immediately beneath the outer facing sheet 19 which has its edge spaced back from the edge of the core 17. The inner recess 28 in the core 17 is parallel to but spaced from the outer core recess 27, in a region intermediate the faces of the core 17, and is adapted to receive the inner flange 23 of the reinforcing member 13. The edge of the panel core 17 is also preferably relieved between recesses 27 and 28 to receive the web portion 24 of the reinforcing member so that, when the reinforcing member is in place, as shown in Fig. 3, the outer surface of web 24 is flush with the surface of the exposed edge of the core 17. The low density core material 17 is easily machined and, consequently, the recesses required therein can be readily provided by sawing or routing the core with ordinary woodworking tools.

The reinforcing member 13 is adhesively secured to the panel core 17 and the panel facing sheet 19 by means of a cement, such as an epoxy resin. The edge of the panel facing sheet 19 is thus protectively covered by the reinforcing member 13 and securely attached thereby to an extended area or region of the core 17, greatly reducing the likelihood of sheet 19 being separated from the core 17. Moreover, the reinforcing member 13 prevents the edge of the sheet 19 and the core from being damaged by blows directed toward the corner of the panel.

It is contemplated that the reinforcing member 13 extend along the several walls of the cabinet 11 and around the corners; as does the outer facing sheet 19 of the panel 11. (See Fig. 3.) By this construction, the member 13 frames one face of the cabinet and additionally strengthens the cabinet. Only one corner of the cabinet is illustrated in the drawing, but is can be readily appreciated that, in cabinet structures having two, three or four corners, the structural arrangement illustrated is merely repeated, with a single elongated reinforcing member 13 serving several corners. It is desirable that the inner flange and connecting web portions 23 and 24 of the member 13 be notched, as indicated at 29 in Fig. 3, before bending the member, in order to prevent buckling of these portions of the member. While this notching, naturally, somewhat weakens the reinforcing member 13 at the corners of the cabinet, the heavier outer flange 22 of the member extends uninterruptedly around the corner and contributes stiffness and strength to the corner.

The covering for the exposed edge of the sandwich panel 12 is completed by a cover strip 30 formed of polystyrene plastic or other impact resistant sheet material. (See Fig. 4.) The cover strip 30 has one edge thereof disposed within a groove 31 provided by an undercut in a trim bead portion 32 of the reinforcing member 13. This groove 31 extends at a substantially right angle to the groove 26 which receives the edge of facing sheet 19. The groove 31 opens generally in the direction of the inner face of the panel 12 and the cover strip 30 extends from this groove, across the exposed edge of the core 17, and has a bent-over edge portion which overlaps the edge of the inner facing sheet 18. The cover strip 30 is preferably cemented, or mechanically fastened, as by screws, to the facing sheet 18.

It can be seen that the reinforcing member 13 and the cover strip 30 cooperate to provide a protective edge cover for the laminated panel 12. Both the reinforcing member 13 and the cover strip 30 can be provided with decorative finishes or made from pigmented material so as to enhance the appearance of the cabinet 11.

In accordance with this invention, the reinforcing member 13 is also utilized in providing support for the cabinet door 14. The reinforcing member 13 is provided with tapped holes in the required locations for the purpose of receiving bolts 34 which secure the cabinet leaf of the door hinge 16 to the cabinet. In this connection, it will be noted that the outer flange portion 22 has a heavy, ungrooved region 33 between its line of jointure with its web 24 and the bottom of groove 26. This region of the member 13 is particularly well adapted for receiving fasteners, such as the bolts 34. The reinforcing member 13 provides a much more reliable region in which to attach the hinge 16 than does the relatively frail facing sheet 19 or core 17 of the laminated panel from which the cabinet walls are made. Neither the facing sheet 19 nor the core 17 has sufficient strength to reliably carry the load of the door 14. The reinforcing member 13, however, being rigid, transmits the weight of the door 14 to extended areas or regions of the panel 12 and imposes no damaging forces on any particular region of the core 17 or the facing sheet 19.

From the foregoing it can be seen that this invention enables a laminated panel having low strength laminations to be strengthened at its edge so that stronger and more rigid cabinets can be formed therefrom. Moreover, the invention enables closure members or other cabinet components to be reliably affixed to the panel.

While the invention is disclosed in but a single preferred embodiment, it is to be understood that it is not so limited, and numerous changes and modifications can be made which fall within the spirit and scope of the invention as defined by the appended claims.

What is claimed is:

1. A laminated panel structure comprising a core of low density material, a thin facing sheet of dense material adhesively secured to one face of the core, a reinforcing member imbedded in an exposed edge of said core and covering an exposed edge of said sheet for strengthening the edge of the panel structure, said member having a channel-shaped cross-section providing two substantially parallel flanges extending longitudinally along the edge of the panel and transversely into said core in planes substantially parallel to said one face of the core, one of the flanges of said member having a longitudinal groove therein extending transversely and inwardly from one edge thereof, said groove receiving said edge of said sheet therein, the other of said flanges being spaced from said one flange and the other face of said core, and means adhesively securing said member to said core and said sheet.

2. A laminated panel structure comprising a core of low density material having an edge, a thin facing sheet of dense material adhesively secured to one face of the core and having one edge disposed parallel to but inwardly of said edge of the core, said core having first and second recesses therein extending along and inwardly from said edge in planes substantially parallel to said one face of the core, said first recess extending immediately beneath said facing sheet, said second recess being parallel to and spaced from said first recess and the other face of said core, a reinforcing member having first and second flange portions disposed, respectively, in said first and second recesses, the first flange portion of said member having a longitudinal groove extending inwardly from one edge thereof and receiving said edge of said facing sheet, and means securing said member to said facing sheet and said core.

3. In a cabinet, a laminated wall comprising a core of low density material and a thin facing sheet of dense material adhesively secured to one face of the core, an elongated reinforcing member extending along one edge of said wall and having a channel-shaped cross-section providing two substantially parallel flanges extending transversely into said core in planes substantially parallel to said one face of the core, one of said flanges having a longitudinal groove therein extending transversely and inwardly from one edge thereof and receiving one edge of said sheet, the other of said flanges being spaced from said one flange and the other face of said core, means adhesively securing said member to said core and said sheet, and a load-bearing hinge leaf secured to said one flange of said member.

4. In a cabinet, a laminated wall comprising a core of low density material and a thin facing sheet of dense material adhesively secured to one face of the core, an elongated reinforcing member extending along one edge of said wall and having a channel-shaped cross-section providing two substantially parallel flanges extending transversely into said core in planes substantially parallel to said one face of the core, one of said flanges being relatively thicker than the other flange and having a longitudinal groove therein extending transversely and part-way in from one edge thereof and receiving one edge of said sheet, the other of said flanges being spaced from said one flange and the other face of said core, means adhesively securing said member to said core and said sheet, and a load-bearing hinge leaf secured to an ungrooved region of said one flange of said member.

5. A laminated panel structure comprising a core of low density material, thin facing sheets of dense material adhesively secured to opposite faces of the core in a manner to expose an edge of said core and an edge of each sheet, said core having first and second recesses therein extending along and inwardly from said edge, said first recess extending immediately beneath one of said facing sheets, said second recess being parallel to and spaced from said first recess and the other of said facing sheets, a reinforcing member having first and second flange portions disposed, respectively, in said first and second recesses, the first flange portion of said member having a longitudinal groove extending inwardly from one edge thereof and receiving said edge of said one facing sheet, said member having another longitudinal groove therein opening at a substantially right angle to the groove in said first flange portion and generally toward the other facing sheet, a strip of covering material extending along said edge of the core and having one edge disposed within the other groove in said member, said strip extending over the exposed edge of said other facing sheet and being secured to the said other facing sheet, and means adhesively securing said member to said core and said one facing sheet.

6. In a cabinet structure, a laminated panel forming at least two connecting walls of the structure and having a core of low density material and a facing sheet adhesively secured to one face of said core, said core being notched at least part-way through and the core and sheet bent to form the junction of said two walls so that said sheet extends continuously over both of said walls, said core and said sheet having exposed edges, and a reinforced edge construction for said structure comprising a reinforcing member bent to extend along the edge of both of said walls and being imbedded in the exposed edge of said core and covering the exposed edge of said sheet, said member having a channel-shaped cross-section providing two substantially parallel longitudinal flanges extending transversely into said core, one of the flanges of said member having a longitudinal groove therein extending transversely and inwardly from one edge thereof, said groove receiving said edge of said sheet therein, the other of said flanges being spaced from said one flange and the other face of said core.

7. In a cabinet structure, a laminated panel forming at least two connecting walls of the structure and having a core of low density material and a facing sheet adhesively secured to one face of said core, said core being notched at least part-way through and the core and sheet bent to form the junction of said two walls so that said sheet extends continuously over both of said walls, said core and said sheet having exposed edges, a reinforcing member bent to extend along the edge of both of said walls and being imbedded in the exposed edge of said core and covering the exposed edge of said sheet, said member having a channel-shaped cross-section providing two substantially parallel longitudinal flanges extending transversely into said core, one of the flanges of said member being thicker than the other flange and having a longitudinal groove therein extending transversely and inwardly from one edge thereof, said groove receiving said edge of said sheet therein, the other of said flanges being spaced from said one flange and the other face of said core, a closure for the cabinet structure, and a closure support secured to said one flange of said member.

8. In a cabinet structure, a laminated panel forming at least two connecting walls of said structure and having a core of low density material and a facing sheet adhesively secured to one face of said core, said core being notched at least part-way through and the core and sheet bent to form the junction of said two walls so that said sheet extends continuously over both of said walls, said core and said sheet having exposed edges, a reinforcing member bent to extend along the edge of both of said walls and being imbedded in the exposed edge of said core and covering the exposed edge of said sheet, said member having a channel-shaped cross-section providing two substantially parallel longitudinal flanges extending transversely into said core, one of the flanges of said member having a longitudinal groove therein extending transversely and part-way in from one edge thereof, said groove receiving said edge of said sheet therein, the other of said flanges being spaced from said one flange and the other face of said core, a closure for the cabinet structure, and a closure support secured to an ungrooved region of said one flange.

References Cited in the file of this patent

UNITED STATES PATENTS

| | | |
|---|---|---|
| 1,953,585 | Brown | Apr. 3, 1934 |
| 2,162,271 | Munters | June 13, 1939 |
| 2,179,542 | Claxton et al. | Nov. 14, 1939 |
| 2,276,635 | Weber | Mar. 17, 1942 |
| 2,552,641 | Morrison | May 15, 1951 |
| 2,662,660 | Frykdahl | Dec. 15, 1953 |
| 2,809,764 | Diamond | Oct. 15, 1957 |